PHOTOSENSITIVE INFORMATION STORING DEVICES

Filed March 11, 1957

2 Sheets-Sheet 1

INVENTOR
FRANCOIS H. RAYMOND
BY
Kemon, Palmer, Stewart & Estabrook
ATTORNEYS

INVENTOR
FRANCOIS H. RAYMOND
BY
Kemon, Palmer, Stewart & Estabrook
ATTORNEYS 3,165,634
Patented Jan. 12, 1965

3,165,634

PHOTOSENSITIVE INFORMATION STORING DEVICES

Francois Henri Raymond, Saint-Germain-en-Laye, France, assignor to Societe d'Electronique et d'Automatisme, Courbevoie, France Filed Mar. 11, 1957, Ser. No. 645,181
Claims priority, application France Mar. 23, 1956
19 Claims. (Cl. 250—219)

The present invention relates to information storage devices including at least one binary coded information storage member. The storage capacity of such a member is a number of information items each comprising one word having a definite number of binary digits or bits. Such devices find application in the well known computing and data processing systems adapted to operate in the binary system of numbering, for instance as a number-word store or an instruction and/or address store, or else as a function numerical plotter or a correspondence table between two sets of numerical codes. As it will be hereinafter made apparent, such a device may, according to the operative control thereof, serve also as an electrical coded signal generator, by a selective reading out of its contents or as an electrical identification signal generator by a comparison of the contents of the storage member with incoming electrical signals.

According to the invention such a device as hereinabove specified comprises, in combination, an information storing element constituted by a light impervious member which has been punched or otherwise impressed with binary coded words according to a raster defined by a pair of virtual networks of relatively crossed lines, means for illuminating the said member on one face thereof, and a photoconducting member on the other side thereof having a surface equal to or homologous to the said storing member, which photoconducting member comprises a layer of a photoresistive material inserted between a pair of networks of conductors so arranged as to reproduce the very configuration of the corresponding two virtual networks according to which the said storing member has been recorded, one of these networks of conductors at least being translucent so that the optical image of the said storing member is applied to the said photoresistive layer therethrough.

The term "photoresistive material" is used herein to define a material which exhibits a photoelectric effect with no substantial delay of response to the application thereto of a light excitation, and which does not exhibit any substantial rectifying effect. Such a material may be for instance pure silicon when made into a layer of very small thickness.

When required, an electroluminescent layer may be formed over the surface of the photoresistive material which faces the storage member of the device, and it is then over such electroluminescent layer that the correspondindg network of conductors is provided. Such an arrangement reduces the noise or, in other words, improves the signal-to-noise ratio in the operation of the device.

The various features and advantages of the invention will be apparent from the following description of one embodiment thereof given by way of example and illustrated in the accompanying drawing of which:

Figure 1:
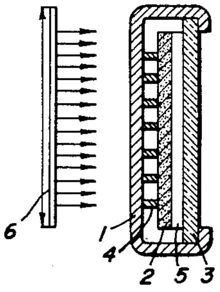
FIGURE 1 is a sectional view of the embodiment as taken along line 1—1 of FIG. 2.
Figure 2:
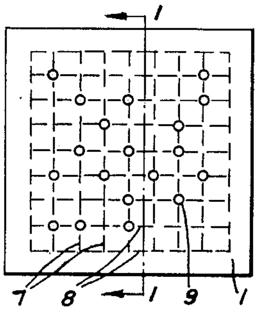
FIGURE 2 is a front view of the storage member therein.
Figure 3:
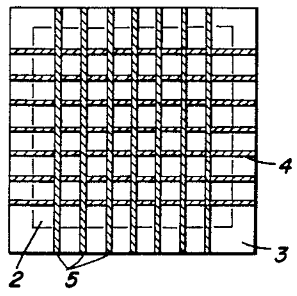
FIGURE 3 is a front view of the photoresistive member therein.

In FIGURES 1 and 2, the permanent storage member is shown as comprising a mechanically self-supporting plate 1 opposite edge portions of which are bent to a C-shape for clamping the photoresistive member against one face thereof. The said photoresistive member includes a photoresistive layer 2 inserted between two crossed networks of conductors 4 and 5. In one of these networks, the conductors are arranged as horizontal lines, see FIGURE 3, and in the other network, the conductors are arranged as vertical lines. These lines correspond to virtual lines 7 and 8 of the storage "raster" or grid on plate 1 for fixing the locations of punched holes 9 in accordance with a predetermined information code. Any hole may for instance represent the binary digital value 1, any binary digital value 0 being represented by an unpunched intersection of the lines 7 and 8. Each line 7 may be considered as storing or capable of storing a single word. The numbers of words and digits per word are quite obviously predetermined and constant in such a store.

Figure 6:
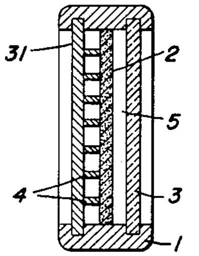
FIGURES 6 and 7 show a modification in which the information pattern is carried by a formed member separately from frame 1.
Figure 7:
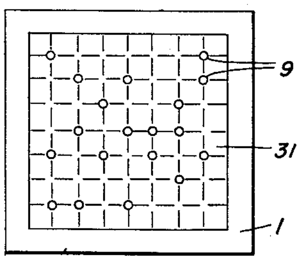

Other practical embodiments may be considered for the constitution of the storage member. For instance, as shown in FIGS. 6 and 7, it may consist of a punched card, or of a photograph i.e. negative of a pattern, formed separately from frame 1 and supported therein as at 31.

Figure 9:
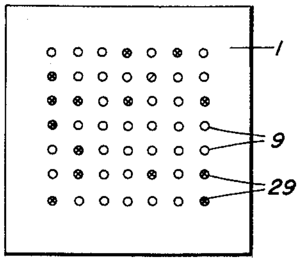
FIGURE 9 shows a front view of the information pattenr member having holes punched therein for the complete raster and the information being applied by obturation of certain holes.

In another embodiment, shown in FIG. 9, the storing member may be constituted by a self-supporting plate 1 provided with holes 9 at all raster positions and the information is applied thereon by masking or plugging some of such holes, as shown by the crossed holes 29.

Figure 10:
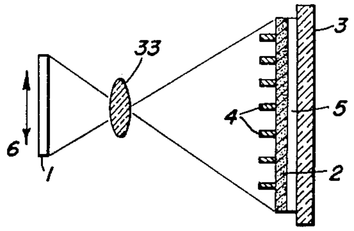
FIGURE 10 is a longitudinal sectional view through a further modification in which the information pattern member is separated from the photoresistive member.

In certain embodiments, as shown in FIG. 10, the storage member 1 will be mechanically separated from the photoresistive element 3–5, and a suitable lens system 33 is provided therebetween so that the area of the two members may be different.

When making the storage member, a primary condition to consider is whether or not the information content of the member is to be varied during the use of the complete device. If such changes must occur, then the device will be so made as mechanically to separate the storing and photoresistive members thereof. If not, the device may be made into a completely unitary structure, for instance by depositing over the photoresistive element thereof an opaque metallic layer and photoetching the said layer according to a definite pattern of coded information. A permanent information store will be readily obtained in this way.

The photoconductive element of the device may be made self-supporting by establishing the components thereof on a dielectric supporting plate 3 which is preferably made translucent for displaying the contents of information of the store. Such an element may be formed as follows, or in a similar way:

The supporting plate 3 is of pure silica and the network of conductors 5 is formed thereon by first depositing by the silk-screen method a negative impression of the network in a viscous suspension of a mixture which comprises by weight 50% of finely powdered silica, passed through a 125 mesh sieve, 26% of pulverulent and pure aluminium, 11% of potassium oxide, 4% of sodium oxide and 1% of sodium borate in a mixture comprising 73% of sodium sulphosuccinate, 12% of methanol, 5% of glycerin and 10% of carboxymethylcellulose; thereafter depositing a film of conducting oxides by a pyrolitic conversion of the vapours of pentabromide of niobium and thorium tetrachloride in a flux of pure oxygen onto the plate which is heated to about 600° C. in an induction oven. Thereafter, the mask of the first operative step is removed by means of chlorhydric acid which does not remove the metallic oxide conductors.

The melting point of such oxide conductors being very high, the silicon film 2 may be formed on them, with a thickness of about 100 microns for instance, by heating the oxide-bearing silica plate up to 1200° C. at least, in a flux of hydrogen with which is mixed silicon tetrachloride. The tetrachloride is reduced by hydrogen and pure silicon is deposited over the oxide-coated silica plate.

The first operative step is repeated for the formation of the second network of conductors over the silicon layer.

Figure 8:
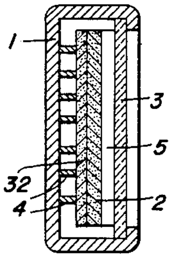
FIGURE 8 shows a modification embodying an electroluminescent layer.

When, as previously stated, an additional layer of electroluminescent material is used in the photoresistive element proper (see FIG. 8), an additional step is taken prior to the formation of the second network of conductors. This step comprises for instance the transfer in an atmosphere of oxygen, by an ionic discharge, of an alloy of such metals as zinc and copper, comprising for instance .8% of copper, the balance of zinc, onto the surface of the silicon layer. To this end, a plate of such an alloy is placed in front of the silicon bearing element in a vessel filled with oxygen at low pressure and a suitable D.C. potential difference is applied between the alloy, acting as a cathode, and the silicon bearing element, acting as an anode. The latter is preferably heated throughout the transfer operation to form the electroluminescent layer 32, FIG. 8, as a monocrystal of the oxide composition. The second electrode network 4 will then be formed by first applying a layer of evaporated metal on the surface of the electroluminescent layer 32, in order to avoid undue heating of the crystal which may adversely affect it, and then forming conductors 4 from this layer by a photoetching process.

The elementary operation of a device according to the invention is as follows: when a voltage is applied to one of the conductors 4 and another voltage to one of the conductors 5, if at the crossing point thereof there exists a light spot from the light source 6 passing through a corresponding hole in the member 1, a current will flow through a load resistance connected to one of the said conductors. However, as the photoresistive material 2 does not possess a substantial transverse resistance, the resulting signal will present a noise due to all stray light spots along the conductors to which the voltages are applied. When an intermediate electroluminescent layer 32 is provided, as in FIGURE 8, the signal to noise ratio will be improved from the light amplification resulting therefrom at the sole point of intersection of the activated conductors. The thickness of the electroluminescent layer will only be of the order of a few molecules.

Various uses may be made of this elementary operation of the device. For instance, a code regenerator may be obtained by the arrangement shown in FIGURE 4. The conductors 4 are inserted in the cathode to ground connections of vacuum tubes 12, through resistances 13. From a pulse distributor 10, the tubes 12 will be sequentially activated as soon as an activation pulse is applied at the input terminal 11 of the pulse distributor. Each one of the conductors 4 will then be activated in turn throughout a pulse distribution period. Similarly the conductors 5 are respectively connected in the anode connections of triode tubes 14 each of the said tubes having its control grid connected to an input terminal 15. When, during a pulse distribution from 10, one of the tubes 14 is activated by a selection voltage applied to the control grid thereof, only one of the conductors 5 is activated and consequently, the current transmitted to an output transformer 17 through the resistance 16 of the anode connection will represent the information stored in the corresponding line of the storage member of the device. A video signal is thus established at the output 18. Of course, other scanning arrangements may be provided without departing from the scope of the invention.

Figure 5:
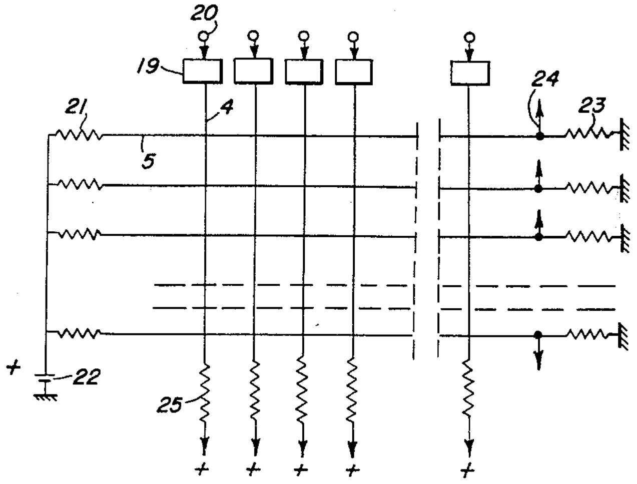
FIGURE 5 shows a corresponding electrical representation of the embodiment and control arrangements, when used as a comparator of incoming signals with the information stored therein.

When, on the other hand, as in FIGURE 5, all the conductors 5 for instance receive a permanent voltage from a battery 22 through isolating resistors 21, and all the conductors 4 are similarly connected in separate circuits of devices 19, each of which receives a current through a resistance 25, each one of the outputs 24 across the end resistances 23 of the said conductors 5 will present a lower voltage which is determined by the light code projected from the information store along the line 5. No possibility of an all zero code exists in such an arrangement. Each one of the devices 19 may present one or the other of two conditions. One of these conditions, which actually is the overall condition, is such as defined above. The other condition is such that no more current will flow through a conductor 4 corresponding to a stage 19 which has been brought to such a condition. In this case, the voltage at the corresponding output 24 will rise to the nominal value of the voltage impressed from battery 22 to the conductors 5. The control of the individual conditions of the stages 19 is effected from input control terminals 20.

When the stages 19 are so arranged as to constitute a code register, able to receive a numerical code in a so-called "parallel" relation (viz. all the digits of the code are simultaneously registered), the voltages marking the binary 1's will produce the cancellation of the corresponding currents in the conductors 4 connected to the actuated stages 19. For a complete coincidence between a code applied to the register 19 and one of the codes along a line 5, the photocell defined along the line 5 will not be activated any more and consequently the corresponding voltage at 24 will rise to the nominal voltage value of the battery, as seen through the resistance 21. The device operates as a simultaneous code comparator, giving an output each time a complete coincidence is observed and even marking the place of the coincidence code within the store. Of course, the arrangement could be such that the same result is obtained for anti-coincidences of codes, one of the codes being the 1's complement of the other. In relation to computers such a circuit is a test circuit, in relation to switching systems, the same arrangement is a routing or marking device.

Figure 4:
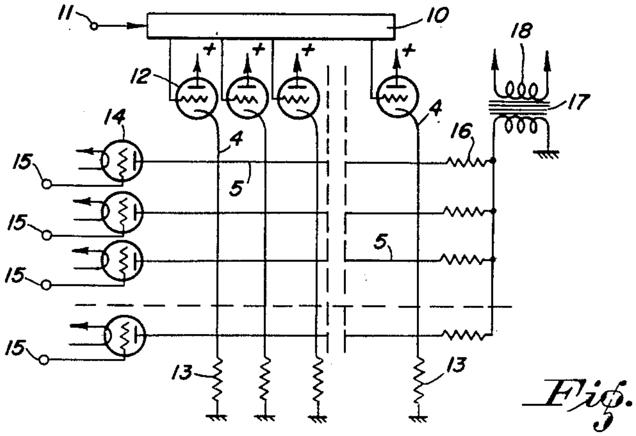
FIGURE 4 shows an electrical representation of the embodiment and control arrangements therefor, when used as an electrical regenerator of stored information.

It is apparent that, for instance, a device according to FIGURE 4 and a device according to FIGURE 5 may be associated in such a fashion that the latter acts as a decoder with respect to the former and for the selection at 15 of one line of the first arrangement. The register 19 will then receive an address of the information store of FIGURE 4, the device will issue a voltage which is the result of the decoding of the address, such voltage activating that line in the information store corresponding to the decoded address and the device of FIGURE 4 then delivers the numerical code which is the actual content of the storing address. Of course, the decoded voltage may be stored in a single-digit store for the activation of one terminal 15 during a time interval appropriate to the time interval of activation of the pulse distributor 10. Such an association may also be considered as a code converter. A first code is applied to the register 19 and, from 18 issues a different code which is the result of the conversion of the first through an intermediate store (that of FIGURE 4). In both of these cases, it is apparent that the complete device may be of unitary structure, part of a single device according to the invention being electrically connected according to FIGURE 4 and another part thereof according to FIGURE 5, with the addition of single-digit stores when useful, between each output 24 and each input 15 of the electrical assembly.

Numerous other applications of devices according to the invention may be considered without departing departing from the spirit and scope of the present invention, as defined by the appended claims.

In the appended claims the term "virtual intersection point" refers to the points at which the two networks of crossing conductors appear to intersect but do not actually intersect.

What is claimed is:

1. A binary data storage device comprising the combination of a storage element consisting of an opaque member upon which an information pattern has been impressed by means of transparent areas in predetermined locations of a storage raster, means for illuminating one side of the said element, a photoresistive member receiving a light pattern determined by said information pattern from the said storage element and comprising a layer of a photoconductive substantially non-rectifying material and a pair of film electrode networks arranged in contact with opposite faces of said photo-conductive layer, each electrode network comprising parallel conductors insulated from each other and extending entirely across said layer, with the conductors of one network crossing the conductors of the other network to form virtual intersection points defining a raster similar to that of said storage raster.

2. The combination according to claim 1 wherein the said layer of photoconductive material is of pure silicon, the surface of the layer exposed to the light pattern supporting the conductors of one electrode network, and an insulating member supporting the conductors of the other electrode network against the other surface of the layer.

3. The combination according to claim 1 wherein the storage element is in the form of a plate, and means on said plate forming a frame for supporting the photoresistive member.

4. The combination according to claim 1 wherein one end of all the conductors of one of the electrode networks is connected to a common output terminal, the other end of each of the said conductors being connected to a distinct terminal, means for selectively applying a voltage to said distinct terminals, a pulse distribution system, the conductors of the second electrode network being connected to the output of said pulse distribution system for sequential energization thereby.

5. A data storage device comprising a layer of photoresistive material having on each face thereof a network of parallel conductors insulated from each other and applied in contact with the respective faces of said layer, the the conductors of one network being transparent and arranged at right angles to the conductors of the other network, and an opaque film covering one network and having small translucent areas therein distributed over said layer according to an information pattern.

6. The combination according to claim 1 wherein the said storage element and said photoresistive member are of identical size and applied against one another within a common supporting frame.

7. Combination according to claim 1 wherein the said storage element is perforated according to the said information pattern.

8. Combination according to claim 1 wherein the said storage element and said photoresistive member are mounted as distinct mechanical members and an optical projection system therebetween for the formation of the light pattern from the said storage element onto the said photoresistive member.

9. The combination according to claim 1 wherein the said storage element comprises an opaque layer applied over the said photoresistive member, said layer being etched in accordance with the information pattern.

10. The combination according to claim 1 further including a thin electroluminescent layer between the said photoconducting material and the one of the said electrode networks which faces the said storage element of the device.

11. The combination according to claim 10 wherein the said electroluminescent layer comprises a thin monocrystalline composition of at least one activating and one activated oxide of metals.

12. Combination according to claim 1 and including a pulse distributing device comprising a parallel numerical code registering device connected to the conductors of one electrode network.

13. Combination according to claim 1 wherein the conductors of the said electrode networks comprise a composition of niobium and thorium oxides.

14. The combination according to claim 10 wherein the electrode network applied over the said electroluminescent material layer comprises a photo-etched metallic film, the conductors of the other electrode comprising a composition of niobium and thorium oxides.

15. An electric switching or selecting device comprising a photoconductive means, a first plurality of light pervious parallel mutually spaced conductors adjacent one side of said photoconductive means, a second plurality of substantially parallel mutually spaced elongated electrical conductors each of which is in contact along the length thereof with the photoconductive means, said first and second pluralities of electrical conductors being disposed transevrse to one another and an opaque means having light pervious means to allow light to be incident upon the photoconductive means at areas adjacent selected ones of the positions where a conductor of said first plurality of conductors crosses over a conductor of said second plurality of conductors.

16. A binary data storage device comprising the combination of a storage element consisting of an opaque member upon which an information pattern has been impressed by means of transparent areas in predetermined locations of a storage raster, means for illuminating one side of the said element, a photo-resistive member receiving the light pattern from the said storage member and comprising a layer of a photo-conductive substantially non-rectifying material and a pair of electrode networks arranged in contact with opposite faces of said photoconductive layer, each electrode network comprising parallel conductors insulated from each other and extending entirely across said layer, with the conductors of one network crossing the conductors of the other network to form virtual intersection points which are aligned with corresponding intersection points of said storage raster, means for selectively impressing a voltage difference between certain conductors in one network and the conductors of the other network, and means deriving from the conductors in said other network electrical signals representative of the thus selected items of information stored in the device.

17. A binary data storage device comprising the combination of a storage element consisting of an opaque member upon which an information pattern has been impressed by means of transparent areas in predetermined locations of a storage raster, means for illuminating one side of the said element, a photo-resistive member receiving the light pattern from the said storage member and comprising a layer of a photo-conductive substantially non-rectifying material and a pair of electrode networks arranged in contact with opposite faces of said photoconductive layer, each electrode network comprising parallel conductors insulated from each other and extending entirely across said layer, with the conductors of one network crossing the conductors of the other network to form virtual intersection points which are aligned with corresponding intersection points of said storage raster, individual connections from conductors of one network to a common point maintained at a fixed potential, an individual impedance element in each said connection, and means for selectively applying to the conductors of the other network a potential of a different value from the potential of said common point.

18. An electric switching or selecting device comprising a first plurality of substantially parallel mutually spaced elongated electrical conductors, a second plurality of substantially parallel mutually spaced elongated electrical conductors which are disposed transverse to, but spaced from, said first plurality of conductors, photoconductive material at each of those positions where a conductor of said first plurality of conductors is separated by the shortest distance from a conductor of said second plurality of conductors to provide an electrical path between those two conductors at that position, the electrical resistance of this path in at least one direction through the photoconductive material when light is incident on that material being low compared with the resistance of that path when light is not so incident, and means to cause light to be incident upon the photoconductive material at selected ones only of said positions.

19. Electric apparatus comprising a device according to claim 16, means adapted to apply an electric signal to any selected one of the plurality of conductors of said one network, and means responsive to the appearance of this signal upon any of the plurality of conductors of the other network due to light being incident at that time upon only selected ones of those positions where the selected one of said conductors of said one network is separated by the shortest distance from the respective conductors of said other network.

References Cited in the file of this patent

UNITED STATES PATENTS

| | | |
|---|---|---|
| 1,880,289 | Sukumlyn | Oct. 4, 1932 |
| 2,342,245 | Bruce et al. | Feb. 22, 1944 |
| 2,586,609 | Burke | Feb. 19, 1952 |
| 2,692,948 | Lion | Oct. 26, 1954 |
| 2,697,649 | Roth | Dec. 21, 1954 |
| 2,698,915 | Piper | Jan. 4, 1955 |
| 2,732,469 | Palmer | Jan. 24, 1956 |
| 2,768,310 | Kazan et al. | Oct. 23, 1956 |
| 2,789,193 | Anderson | Apr. 16, 1957 |
| 2,818,531 | Peek | Dec. 31, 1957 |
| 2,897,399 | Garwin et al. | July 28, 1959 |
| 2,912,592 | Mayer | Nov. 10, 1959 |
| 2,915,641 | Rothschild | Dec. 1, 1959 |

FOREIGN PATENTS

| | | |
|---|---|---|
| 594,945 | Great Britain | Nov. 24, 1947 |

OTHER REFERENCES

Keller: IBM Technical Disclosure Bulletin; volume 1, No. 1, June 1958, page 38.